United States Patent
Jacobs et al.

(10) Patent No.: US 9,260,210 B2
(45) Date of Patent: Feb. 16, 2016

(54) PACKAGING SYSTEM AND METHOD UTILIZING INTELLIGENT CONVEYOR SYSTEMS

(71) Applicant: ROCKWELL AUTOMATION, INC., Milwaukee, WI (US)

(72) Inventors: Keith G. Jacobs, Loveland, OH (US); Glen C. Wernersbach, Cincinnati, OH (US); Mark F. Smith, Amelia, OH (US)

(73) Assignee: Rockwell Automation, Inc., Milwuakee, WI (US)

( * ) Notice: Subject to any disclaimer, the term of this patent is extended or adjusted under 35 U.S.C. 154(b) by 0 days.

(21) Appl. No.: 14/686,199

(22) Filed: Apr. 14, 2015

(65) Prior Publication Data

US 2015/0217887 A1  Aug. 6, 2015

Related U.S. Application Data

(63) Continuation of application No. 14/034,925, filed on Sep. 24, 2013, now Pat. No. 9,008,831.

(60) Provisional application No. 61/705,240, filed on Sep. 25, 2012.

(51) Int. Cl.
| | | |
|---|---|---|
| G06F 7/00 | (2006.01) |
| B65B 35/52 | (2006.01) |
| B65G 47/52 | (2006.01) |
| B65G 43/08 | (2006.01) |
| B65B 35/50 | (2006.01) |
| B65B 35/36 | (2006.01) |
| B65G 37/00 | (2006.01) |
| B65G 57/03 | (2006.01) |
| B65G 54/02 | (2006.01) |

(52) U.S. Cl.
CPC ............... *B65B 35/52* (2013.01); *B65B 35/36* (2013.01); *B65B 35/50* (2013.01); *B65G 37/00* (2013.01); *B65G 43/08* (2013.01); *B65G 47/52* (2013.01); *B65G 57/03* (2013.01); *B65G 54/02* (2013.01)

(58) Field of Classification Search
None
See application file for complete search history.

(56) References Cited

U.S. PATENT DOCUMENTS

| | | | | |
|---|---|---|---|---|
| 5,136,826 A * | 8/1992 | Carson | ............... | B65B 43/42 414/416.07 |
| 5,630,309 A * | 5/1997 | Blidung | ............... | B65B 43/126 198/347.4 |
| 2007/0079576 A1* | 4/2007 | Biondi | ............... | B65B 19/04 53/466 |
| 2008/0121569 A1* | 5/2008 | Ottmann | ............... | B65B 21/06 209/522 |
| 2009/0313952 A1* | 12/2009 | Martelli | ............... | B65B 5/103 53/474 |
| 2011/0132800 A1* | 6/2011 | Cerf | ............... | B65B 35/40 206/597 |
| 2012/0103758 A1* | 5/2012 | Zampollo | ............... | B65H 33/16 198/418.3 |

* cited by examiner

*Primary Examiner* — Yolanda Cumbess
(74) *Attorney, Agent, or Firm* — Fletcher Yoder P.C.

(57) ABSTRACT

A packaging system and method for receiving articles from a first location, such as a product delivery system, transporting the articles to a second location for unloading the articles such that they are placed in a desired orientation and number of columns, rows, and stacks.

20 Claims, 16 Drawing Sheets

PACKAGING SYSTEM AND METHOD UTILIZING INTELLIGENT CONVEYOR SYSTEMS

CROSS-REFERENCE TO RELATED APPLICATIONS

This application relates to and claims benefit to U.S. Provisional Application No. 61/705,240, filed Sep. 25, 2012. This application is a Continuation Application of U.S. patent application Ser. No. 14/034,925, filed Sep. 24, 2013, entitled "Packaging System and Method Utilizing Intelligent Conveyor Systems," now U.S. Pat. No. 9,008,831, which is herein incorporated by reference.

BACKGROUND OF THE INVENTION

The subject invention relates to packaging systems, and more particularly, a packaging system and method utilizing intelligent conveyor systems effective for delivering articles from a first location to a second location and for placing articles into a desired number of rows, columns and stacks.

Packaging systems have been developed for transporting articles from a manufacturing operation or storage location to a system for aligning the articles into a desired configuration for packaging and shipment. Such systems often have conveyors with conveyor belts for moving articles to an elevator apparatus that operates to stack the articles into a desired configuration of rows, columns, and stacks then move the stacked articles for placement into cartons for shipment or to another location before shipment. Such conventional automatic packaging systems however are typically very complex, or operate only for moving identical articles traveling down a conveyor, or have difficulties in handling articles with irregular shapes, or are not easily converted to handle different size articles, or are not easily modified or reprogrammed to arrange articles into different packaging configurations.

Further, packaging systems use conventional conveyor systems having conveyor belts that move articles from one location to a second location whereby the articles are removed by hand from the conveyor and placed into a container or package. Such systems typically depend on the ability of one or more individuals to remove the articles and properly place them into a container or package. Unfortunately, such systems typically are unable to adjust the speed of delivery of the articles to different unloading stations thereby often resulting in article back-up or articles being displaced or being expelled from the conveyor system. Further, such systems cannot automatically determine if a backup is occurring and automatically adjust the delivery of articles being delivered to that unloading station.

Accordingly, a need exists for a packaging system that can operate to receive articles from a first location and transport the articles to a second location for arrangement of the articles into a desired number of rows, columns, and/or stacks, that can easily handle articles with irregular shapes, and that can be easily converted to handle different size articles and/or to arrange the articles into various packaging configurations. Further, a need exist for a packaging system that can easily pack different articles into a single container or package, can be easily modified to accommodate different product streams, and can automatically adjust the delivery of articles to one or more unloading stations.

SUMMARY OF THE INVENTION

The present invention relates to a packaging system for receiving articles from a product delivery system and to transport the articles to a specific second location, such as an unloading station, to be unloaded and placed into a desired number of columns, rows, and/or stacks. Preferably, the packaging system comprises a first conveyor assembly comprised of interconnected track sections. Each section has a plurality of individually controlled electromagnet coils effective for creating electromagnetic fields, a plurality of movers or pallets mounted for movement along the conveyor assembly and having magnetic reaction elements positioned thereon. Preferably, the first conveyor assembly is an intelligent conveyor assembly such that each pallet is controlled and moved independent of each other and electrically coupled to a control system that operates to control the motion of each pallet, and further includes a reaction element, and a control sensor. The reaction elements cooperate with the electromagnetic coils positioned along the interconnected sections that operate to move the pallets when the coils are energized. The first conveyor assembly includes an article receiving station that operates in conjunction with an article delivery system to receive an article stream of individual articles at a first location and deliver the articles to a second location, such as an article unloading station that receives articles being transported along the first conveyor assembly by the pallets. The article receiving station includes a loading mechanism that operates to align and place one or more individual articles onto pallets. In a preferred embodiment the second location includes a deposit mechanism that operates such that the articles being transported by the pallets along the first conveyor assembly reach a drop that allows the articles to drop onto a platform for placement into a package or carton, or onto a second conveyor assembly that move the articles to another second location for further processing or placement into a package or container.

In a preferred embodiment of the invention, the packaging system operates to arrange articles into a desired number of adjacent rows.

In another preferred embodiment of the invention, the packaging system operates to arrange articles into a desired configuration of rows and columns.

In another preferred embodiment of the invention, the packaging system comprises a second conveyor assembly for receiving articles from the first conveyor assembly and arranging them into a desired number of columns.

In another preferred embodiment of the invention, the second conveyor assembly operates to arrange articles into a desired number of columns.

In another preferred embodiment of the invention, the first and/or second conveyor assembly includes a pivotal pallet effective for changing the orientation of one or more articles.

In another preferred embodiment of the invention, the second conveyor assembly comprises interconnected track sections, each section has a plurality of individually controlled electromagnet coils effective for creating electromagnetic fields, a plurality of pallets mounted for movement along the second conveyor assembly and having magnetic reaction elements positioned thereon.

In another preferred embodiment of the invention, each pallet of the second conveyor assembly is movable independent of each other and electrically coupled to a control system that operates to control the motion of each pallet.

In another preferred embodiment of the invention, the pallets include a grasping mechanism for grasping an article as it is transported along the conveyor assembly.

In another preferred embodiment of the invention the control system operates to control the grasping mechanism such that an article is grasped at the article receiving station and transported to the second location such that the control system operates to release the article from the grasping mechanism when the article arrives at the second location.

In another preferred embodiment of the invention, each pallet includes a hatch system that operates to allow articles being transported by the pallet to drop into a desired position.

In another preferred embodiment of the invention, the packaging system includes a stacking mechanism for stacking articles.

In another preferred embodiment of the invention, the stacking mechanism includes a stacking platform that operates to receive articles from pallets such that the articles are stacked one upon the other until the desired number of stacks are obtained.

In another preferred embodiment of the invention, the packaging system operates to sense a back-up at a second location, such as an unloading station, and automatically adjust the speed of articles being delivered to that second location.

In another preferred embodiment of the invention, the packaging system operates to sense a back-up at a second location, such as an unloading station, and automatically stops delivering articles to that second location.

Other advantages of the invention will be apparent from the following description and the accompanying drawings.

BRIEF DESCRIPTION OF THE DRAWINGS

To provide a more complete understanding of the present invention and further features and advantages thereof, reference is now made to the following description taken in conjunction with the accompanying drawings, in which.

DETAILED DESCRIPTION OF A PREFERRED EMBODIMENT

Figure 1:
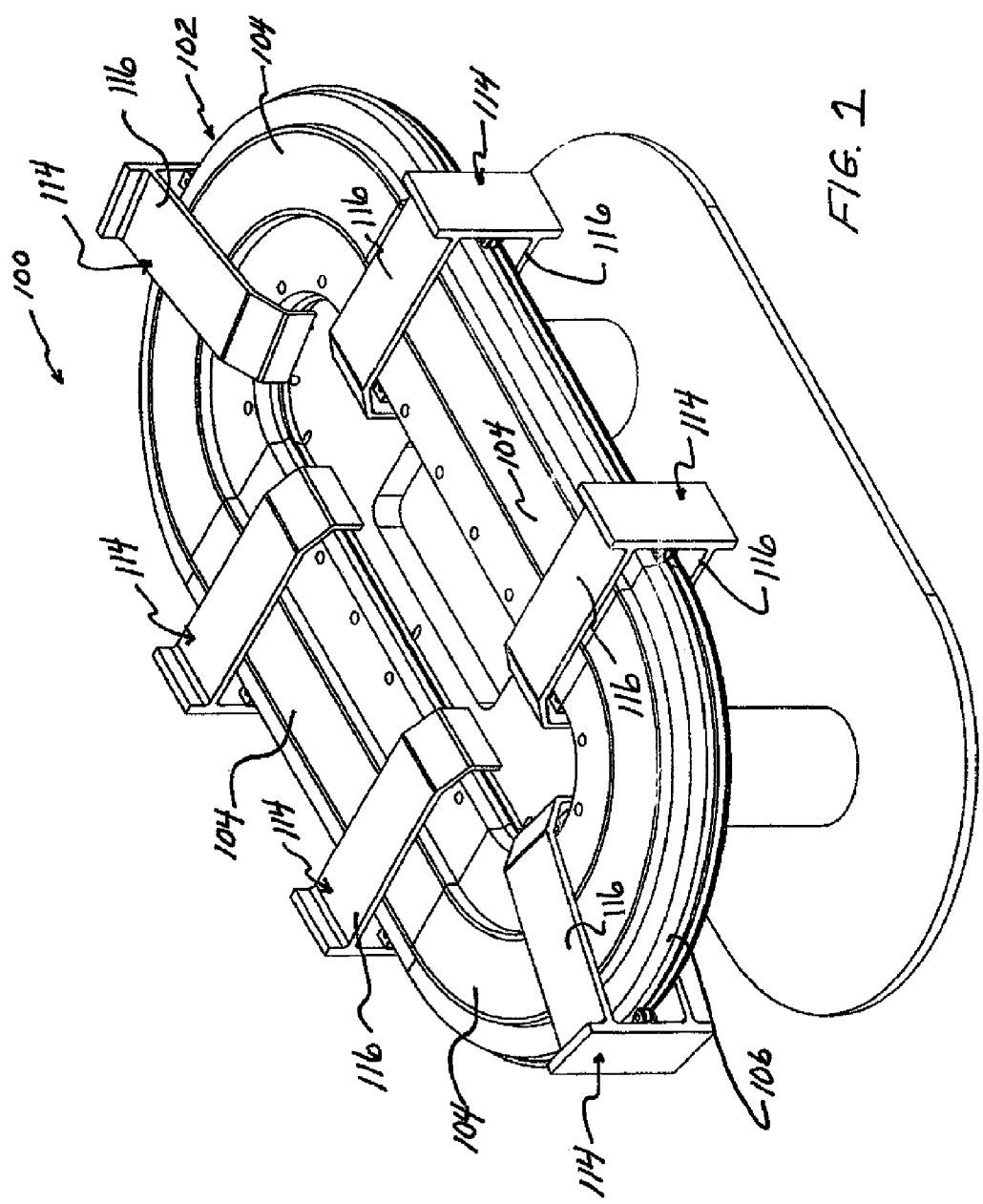
FIG. 1 is a schematic illustration of a preferred embodiment of the packaging system comprising a conveyor assembly for use with an article delivery system and a second location, such as an article unloading station.

The present invention relates to a packaging system for receiving articles from a first location, such as a product delivery system, transporting the articles to a second location, such as an unloading station, for unloading the articles such that they are placed in a desired orientation and number of columns, rows, and stacks. In describing the preferred embodiments of the invention illustrated in the drawings, specific terminology will be resorted to for the sake of clarity. However, the invention is not intended to be limited to the specific terms so selected, and it is to be understood that each specific term includes all technical equivalents that operate in a similar manner to accomplish a similar purpose.

Figure 2:
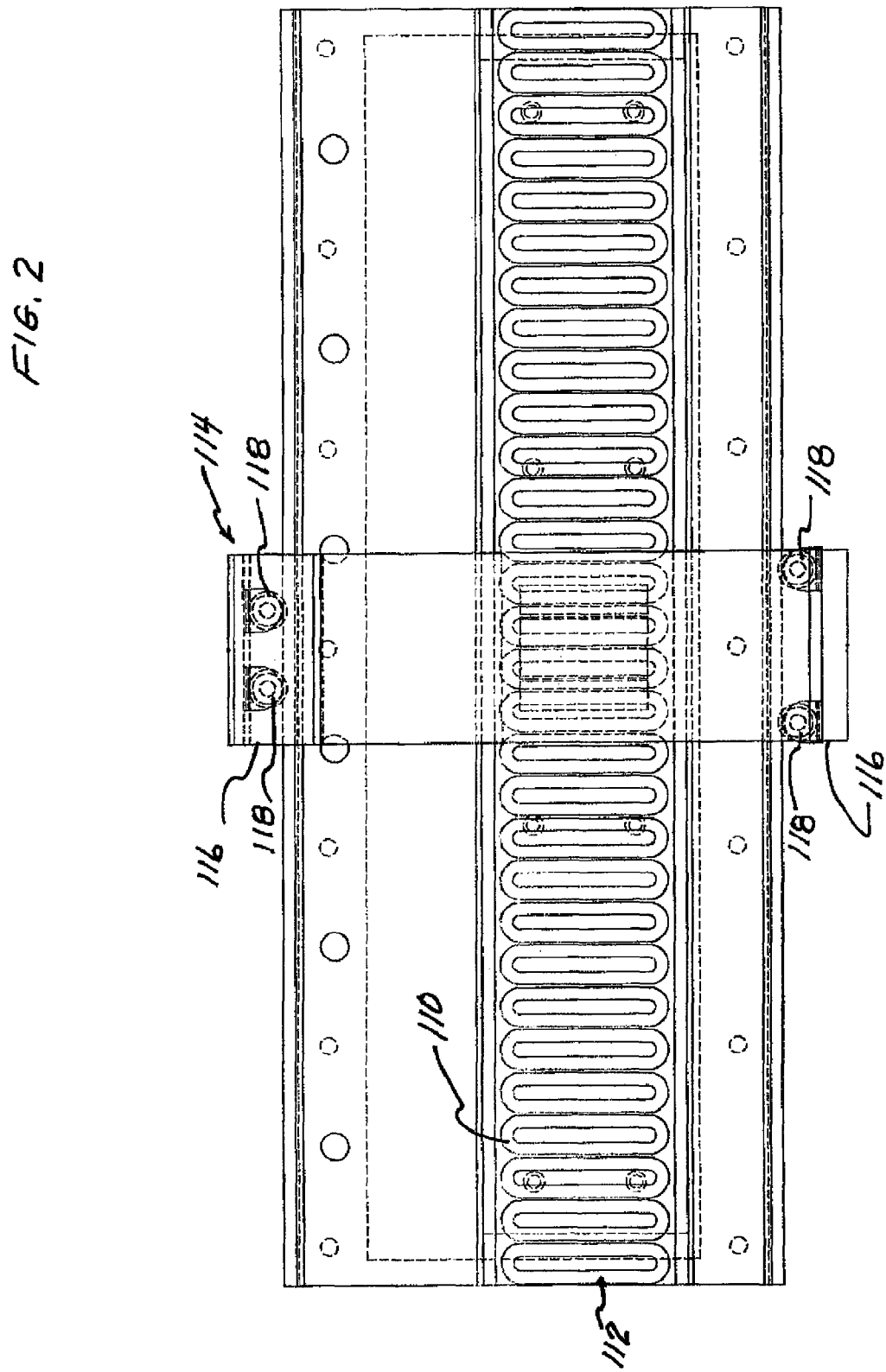
FIG. 2 is a schematic illustration of a portion of the interconnected track sections forming a conveyor assembly, each section having a plurality of electromagnet coils and at least one pallet coupled for movement along the track sections for cooperating with reaction elements on each pallet to move the pallets along the track sections.

Referring to FIG. 1, a portion of a preferred embodiment the packaging system 100 of the subject invention is shown comprising a first conveyor assembly 102 having interconnected track sections 104 with an outer wall 106. As shown in FIG. 2, mounted to the inner surface 108 of the outer wall 106 are activation elements 110 comprising a plurality of electromagnet coils 112 effective for creating electromagnetic fields.

Figure 3:
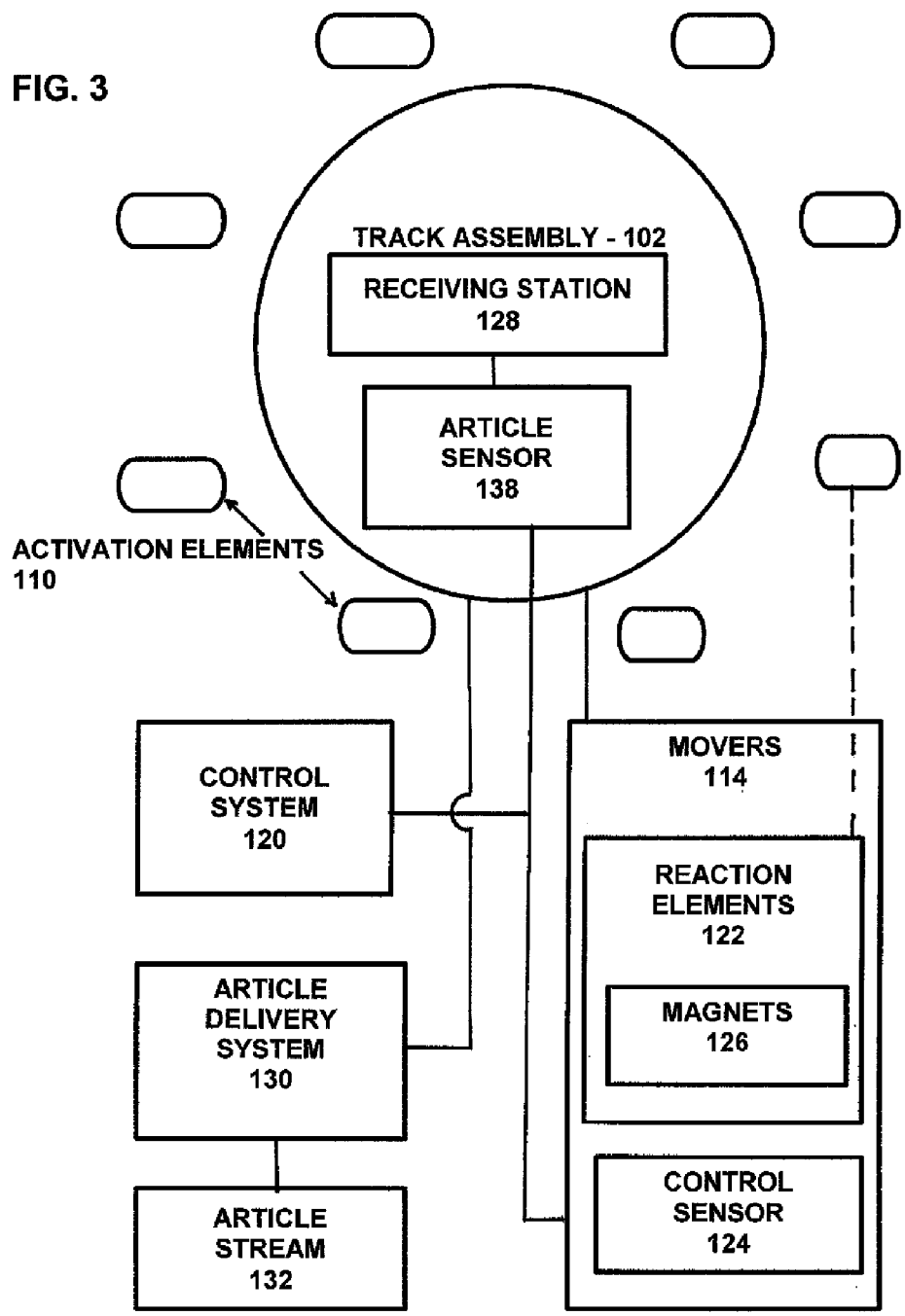
FIG. 3 is a schematic illustration showing the relationship between the conveyor assembly, the article delivery system, pallets, and the control system of a preferred embodiment of the packaging system.
Figure 4:
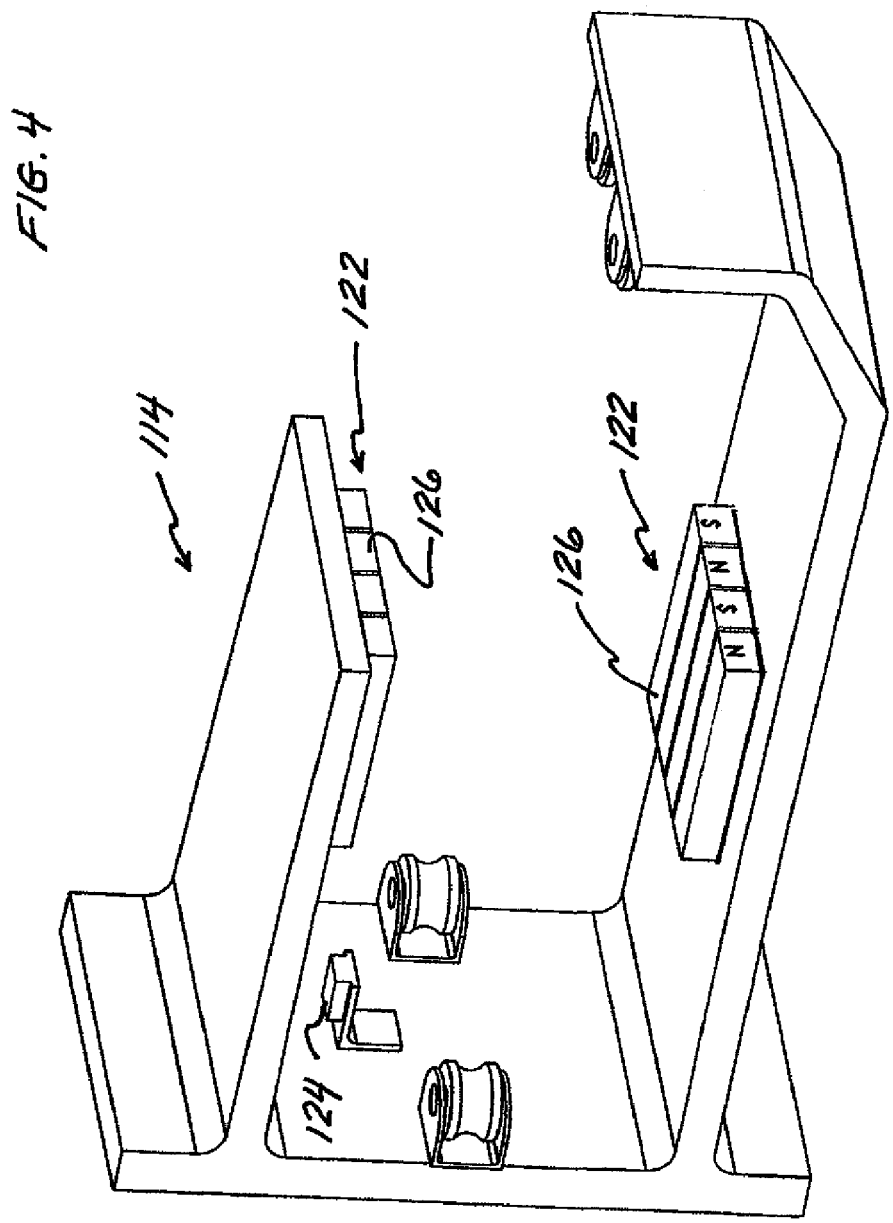
FIG. 4 is a schematic illustration showing a preferred embodiment of a pallet for use with the conveyor assembly of FIG. 1 showing the reaction elements thereon.

Further, as illustrated in FIGS. 1 and 2, coupled to the first conveyor assembly 102 is a plurality of pallets (or movers) 114 having upper and/or lower mounts 116 and one or more rollers 118 that cooperate together for mounting each pallet 114 for movement along the first conveyor assembly 102. As shown in FIGS. 3 and 4, the first conveyor assembly 102 is an intelligent conveyor system wherein each pallet 114 is movable independent of each other and electrically coupled to a control system 120 (FIGS. 3 and 14) that operates to control the motion of each pallet 114. Preferably, each pallet 114 includes a reaction element 122 and a control sensor 124. The reaction element 122 preferably comprises one or more magnets 126, such as rare-earth permanent magnets, which cooperate with the activation elements 110 positioned along the first conveyor assembly 102 to produce relative movement there between when the activation elements 110 are energized.

Figure 5:
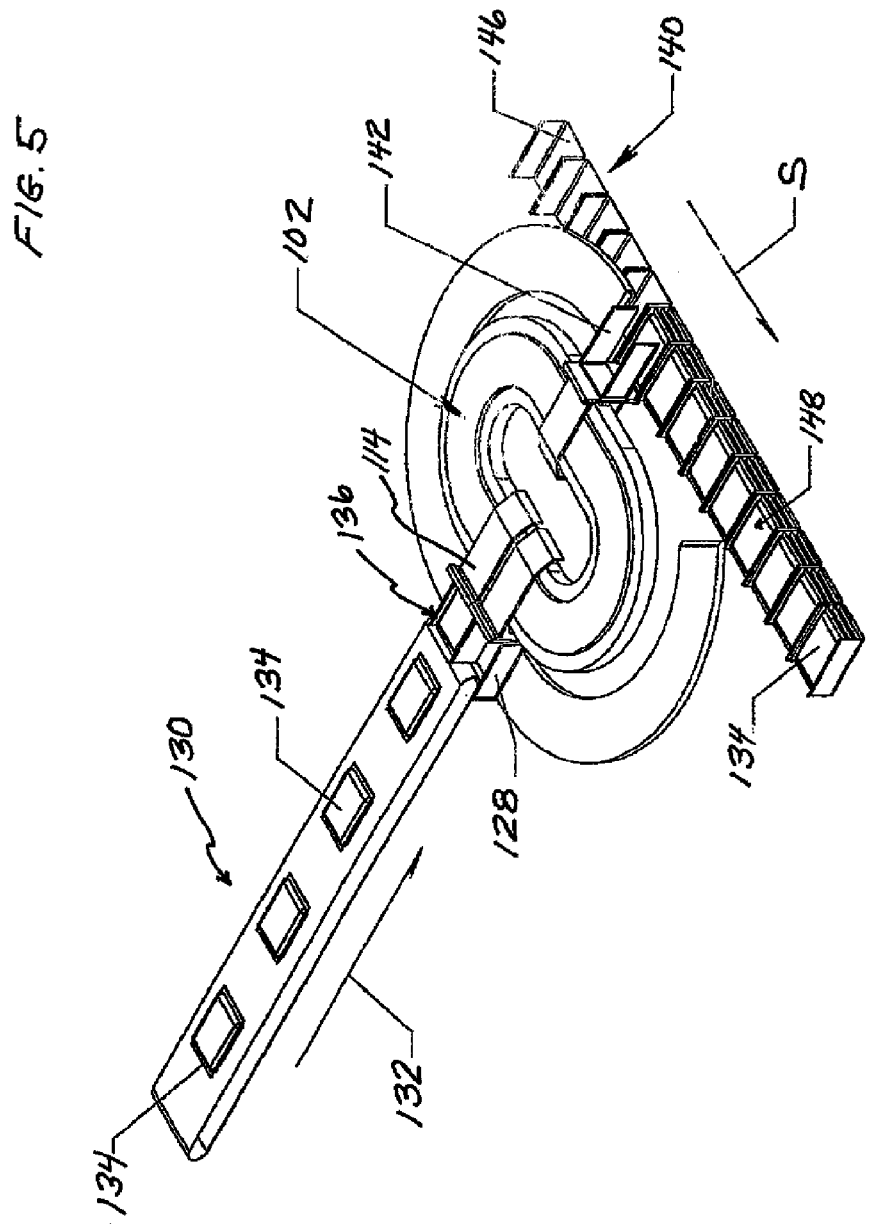
FIG. 5 is a schematic illustration of the track assembly of FIG. 1 showing a preferred embodiment of an article delivery system and a second location having a deposit mechanism.

Referring to FIGS. 3 and 5, in a preferred embodiment of the invention, the first conveyor assembly 102 includes an article receiving station 128 that operates in conjunction with an article delivery system 130, such as a conventional conveyor, to receive an article stream 132 comprising a plurality of individual articles 134. In a preferred embodiment of the invention, the article delivery system 130 includes a loading mechanism 136, such as a chute, for aligning and placing an individual article 134 onto a pallet (mover) 114. An article sensor 138 is provided and cooperates with the control system 120 (FIGS. 3 and 14) to ensure that a pallet 114 for receiving an article is in proper alignment with the loading mechanism 136 for receiving the article 134 being feed into the loading mechanism 136 and provides a signal to an operator and/or to the control system 120.

As shown in FIG. 5, the first conveyor assembly 102 further includes a second location, such as an article unloading station 140, for receiving articles 134 being transported to the second location 140 by pallets 114. In a preferred embodiment, as shown, the second location 140 is an unloading system such that an article 134 is transported along the first conveyor assembly 102 by a pallet 114 until it reaches the unloading station 140. As shown in this embodiment, the unloading station 140 comprises a deposit mechanism 142, such as a drop, that operates to deposit the article(s) 134 onto a platform 143 or directly deposits the articles into a container or package 145 or onto second conveyor assembly 146, such as a conventional conveyor or an intelligent conveyor system as described above, for moving articles 134 to another system or location for further processing. It should now be apparent to one skilled in the art that by controlling the speed S of the pallets 114 or using two or more deposit mechanisms 142, or using an adjustable deposit mechanism (such as one that can pivot) allows the packaging system 100 to stack articles into a predetermined number of adjacent stacks 148 having a desired proximity to each other. It should also now be understood that by controlling the speed S of the pallets 114 traveling along the first conveyor assembly 102 and the second conveyor assembly 146 (or the speed of the pallets 114b traveling along the second conveyor assembly 146) allows the packaging system 100 to stack articles into a predetermined number of adjacent stacks 148. It should also now be apparent to one skilled in the art that by controlling the speed of the pallets 114 and the second conveyor assembly 146 (or the speed of the pallets 114b traveling along the second conveyor assembly 146), articles 134 can be placed in a predetermined number of stacks 148 having a desired proximity to each other.

Figure 6:
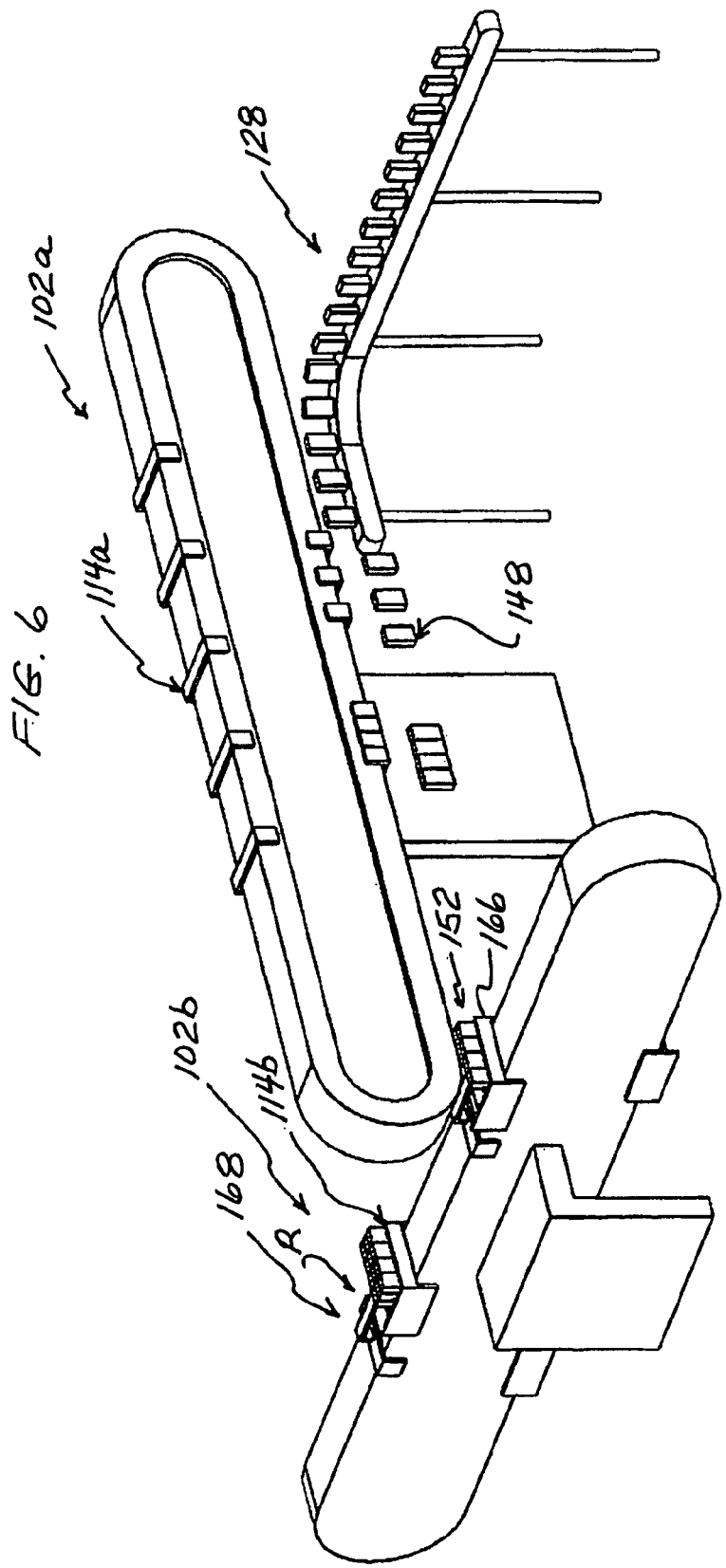
FIG. 6 is a schematic illustration showing of another preferred embodiment of the packaging system of the subject application showing a second conveyor assembly for receiving articles or stack of articles from a first conveyor assembly and for placing the articles into a desired configuration of rows, columns and or stacks and showing a pallet having an article receiving component and an article alignment component that operate together to ensure that articles being deposited on pallets are maintained in position on the pallets as the pallets travel along the conveyor assembly.
Figure 7:
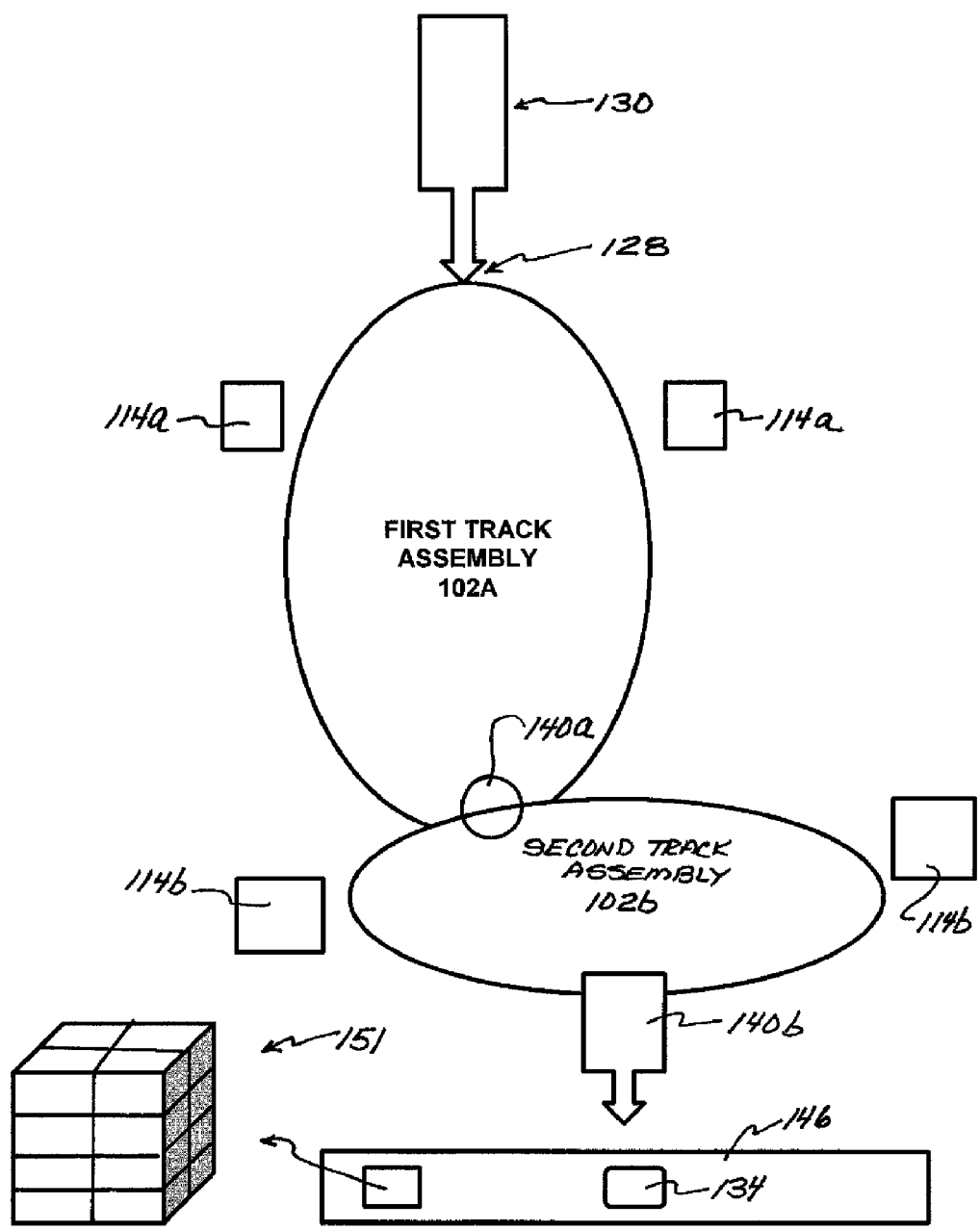
FIG. 7 is a schematic illustration showing the relationship between the first conveyor assembly and the second conveyor assembly and having a deposit mechanism for placing articles in a desired configuration.

In another preferred embodiment, as shown in FIGS. 6 and 7, the packaging system 100 comprises a first conveyor assembly 102 that operates, such as shown in FIG. 5 and described above, to place articles into stacks or rows and to transfers such stacks 148 (or individual articles 134, if stacks are not desired) to a second article receiving station 152 of a second conveyor assembly 146 and functions to place articles or stacks of articles onto a plurality of secondary pallets 114b, such as by way of a chute (not shown). The second conveyor assembly 146 operates to transport articles 134, such as stacks or rows of articles, to a secondary article unloading station 140b, such as the article unloading station 140 described above. It should be understood that the secondary article unloading station 140b can comprise a drop, slide, or other apparatus that operates to allow articles 134 (or stacks and/or rows of articles) to drop onto a second conveyor assembly 146, such as a conventional conveyor or intelligent conveyor system, for moving the articles or stacks of articles to another system or another second location for further processing. It should also now be apparent to one skilled in the art that by controlling the speed of the secondary pallets 114b and the second conveyor assembly 146 allows the packaging system 100 to form stacks having a predetermined number of articles in each stack. It should also now be apparent to one skilled in the art that by controlling the speed of the pallets 114b and the second conveyor assembly 146, allows articles or stacks of articles to be placed in a desired number of columns such that the articles are placed in a desired article package configuration 150 of rows, columns and stacks having a desired proximity to each other. In this way, the product packaging system of the subject invention allows articles to be automatically stacked, placed into rows, placed into columns, or placed into a combination of stacks, rows, and columns.

Figure 8:
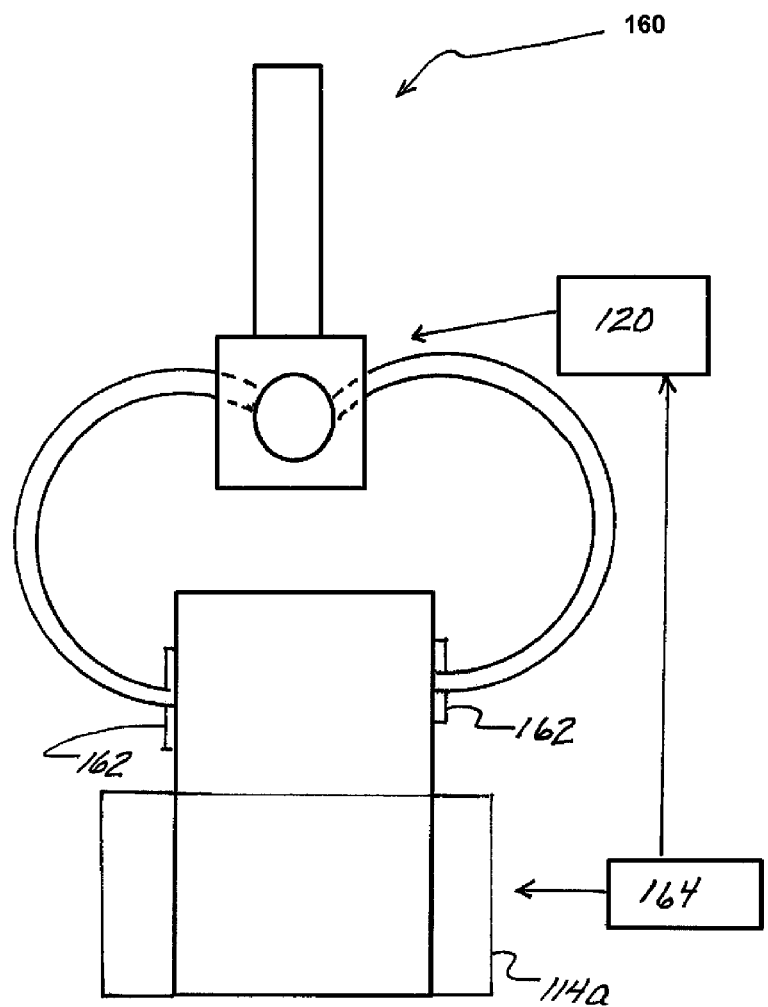
FIG. 8 is a schematic illustration of another preferred embodiment of the packaging system showing a pallet having a gripping mechanism for gripping an article.

In another preferred embodiment of the invention, as shown in FIGS. 6 and 8, pallets 114a each include a gripping mechanism 160 such as an electric-mechanical gripping means that operates to grip an article 134, such as between two gripping heads 162. Preferably, the gripping mechanism 160 is magnetically operated and electrically coupled to the control system 120 (FIG. 3) such that when a pallet 114a transporting one or more articles 134 is properly positioned in the article receiving station 128, a sensor 164 transmits a signal to the control system 120 that reacts by energizing the gripping mechanism 160 to clasp the one or more article(s) 134 and carry them to a second location or for placement on a second conveyor assembly 146. The pallets 114 can then move along the first conveyor assembly 102 to a second location 140 or to a second product receiving station 128b of a second conveyor assembly 146 having pallets 114b. It should now be apparent to one skilled in the art that by controlling the speed of the pallets 114a traveling along the first conveyor assembly 102, or by controlling the speed of the pallets 114a traveling along the first conveyor assembly 102 and/or the pallets 114b traveling along the second conveyor assembly 146, allows the packaging system 100 to operate to arrange articles 134 in a desired configuration, such as a desired number of rows, columns and stacks.

Figure 15:
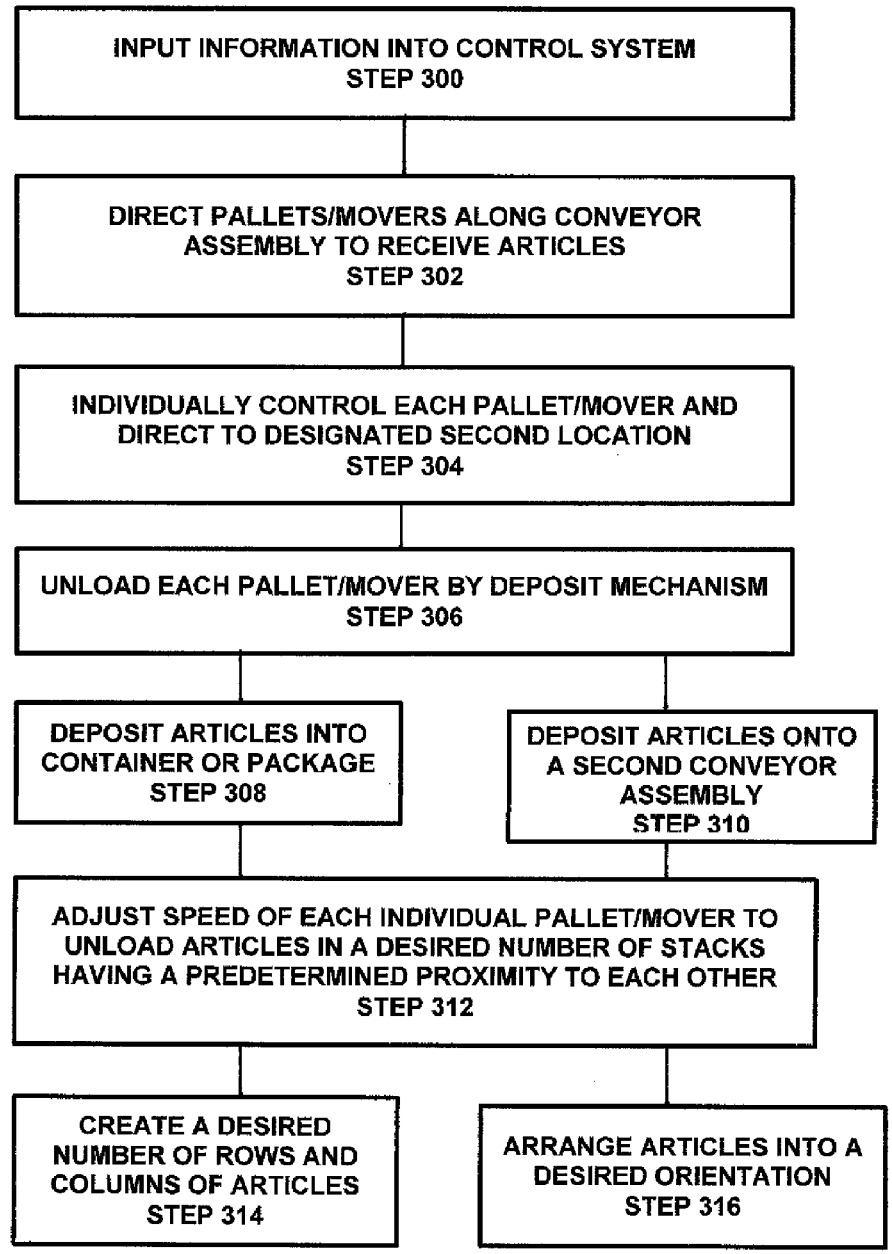
FIG. 15 is a flow diagram showing a preferred method of operation of the packing system of the subject invention.

After the gripping mechanism 160 has operated to clasp or grab an article 134, the pallet 114a travels along the first conveyor assembly 102. It should now be apparent that the pallets 114a can be individually controlled, such as by increasing or decreasing the speed that the pallet is traveling along the first conveyor assembly 102. Further, the pallets 114a operate to move to a particular location whereby the gripping mechanism 160 is released allowing the article 134 to be deposited onto a secondary pallet 114b of the second conveyor assembly 146. Referring to FIG. 6, a preferred embodiment of the invention is shown whereby pallets 114a are positioned at predefined positions such that when the individual gripping mechanisms 160 releases the articles 134 such that the articles are positioned in a desired number of rows R (FIG. 15).

Figure 9:
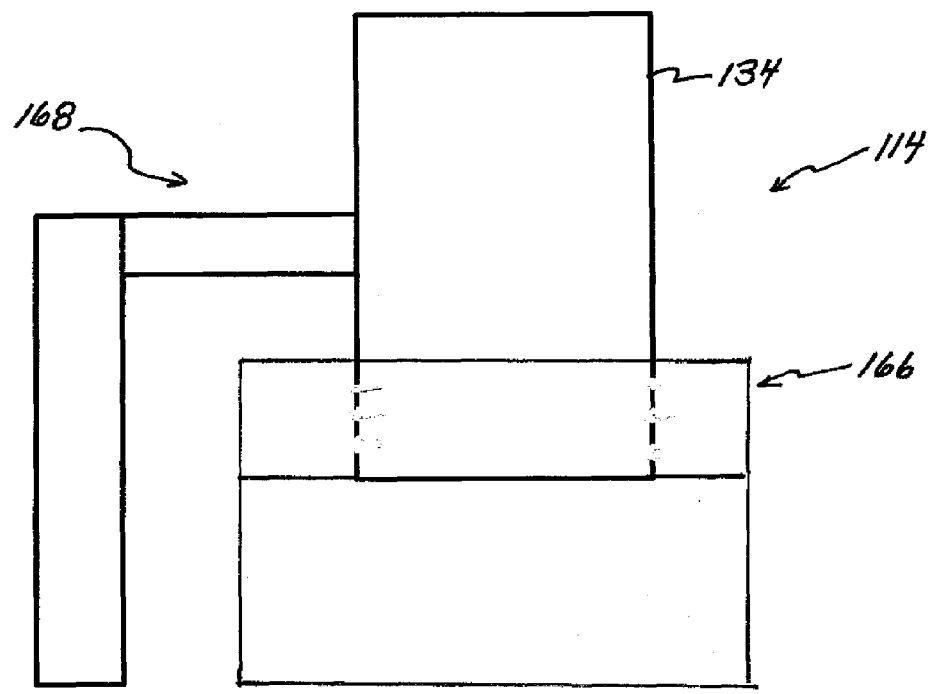
FIG. 9 is a schematic illustration of the packaging system of FIG. 6 showing a pallet having an article receiving component and an article alignment component.

As shown in FIGS. 6 and 7, in another preferred embodiment the packaging system 100 comprises a first conveyor assembly 102 and a second conveyor assembly 146. The first conveyor assembly 102 includes an article receiving station 128a for receiving individual articles 134 from an article stream 132. The first conveyor assembly 102 includes a plurality of pallets 114a that each operate to receive at least one article 134 at the article receiving station 128a such as described above. The pallets 114a travel along the first conveyor assembly 102 to deliver the articles to a second location, such as an article unloading station 140a. In a preferred embodiment of the invention, the first conveyor assembly 102 overlaps an article receiving station 128b of a second conveyor assembly 146 such that articles 134 being transported by pallets 114a are deposited on pallets 114b of the second conveyor assembly 146. It should now be understood that by regulating the speed and placement of pallets 114a and 114b, the articles being loaded on pallets 114b can be placed in a desired number of rows, columns and stacks. In a preferred embodiment of the invention, as shown in FIGS. 6 and 9, pallets 114b further comprise an article receiving component 166 and an article alignment component 168 that operate together to ensure that articles 134 being deposited on pallets 114b are maintained in position on the pallets 114b as the pallets travel along the second conveyor assembly 146. It should be understood that as described above the article receiving component 166 and the article alignment component 168 each include a reaction element and a control sensor and the reaction element cooperate with the activation elements positioned along the track assembly to produce relative movement there between when the activation elements are energized (such as described above). Accordingly, the article receiving component 166 and the article alignment component 168 can each move independent from each other.

Figure 10:
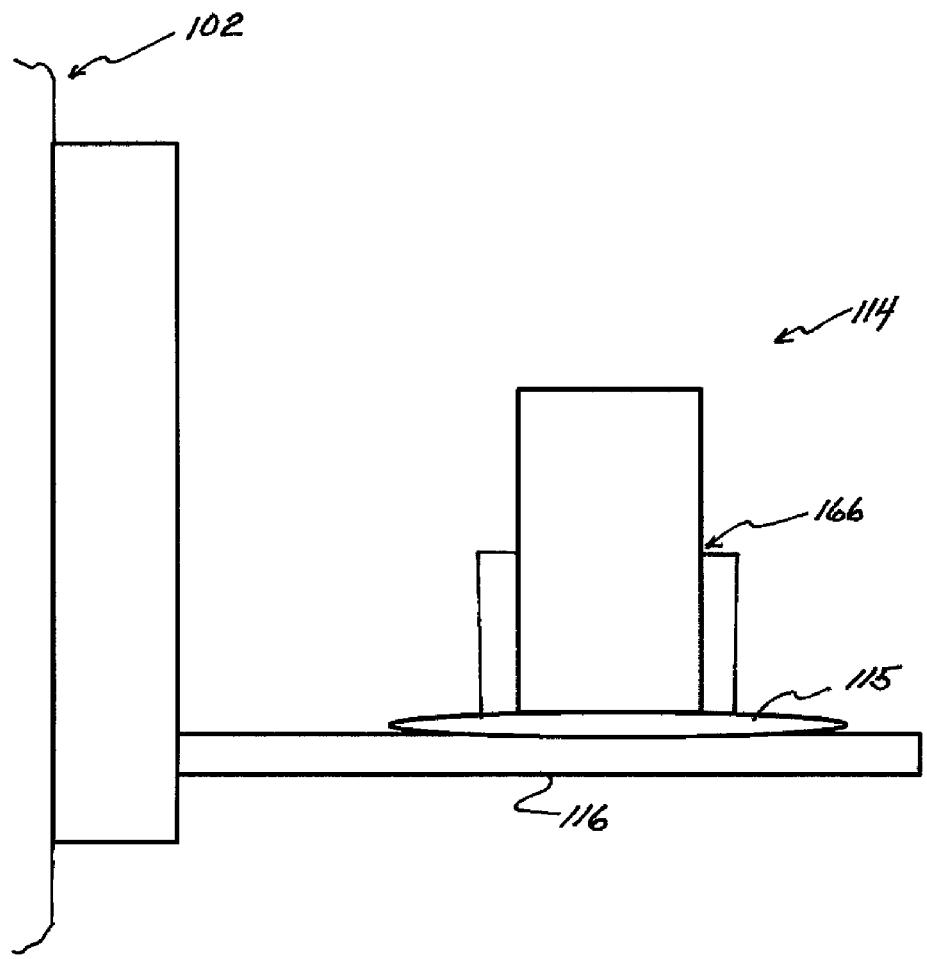
FIG. 10 is a schematic illustration of a packaging system of the subject invention showing a pallet having a pivotal article receiving component for rotating an article of a group of articles into a desired orientation.

Referring to FIG. 10, another preferred embodiment of the packaging system 100 of the subject invention is shown in which the pallets 114 traveling around the first conveyor assembly 102 includes an article receiving component 166 that is pivotally coupled, such as by an electrically driven rotating plate 115, to upper and lower mounts 116 such that article(s) being transported by a pallet 114 and be rotated into a desired orientation.

Figure 11:
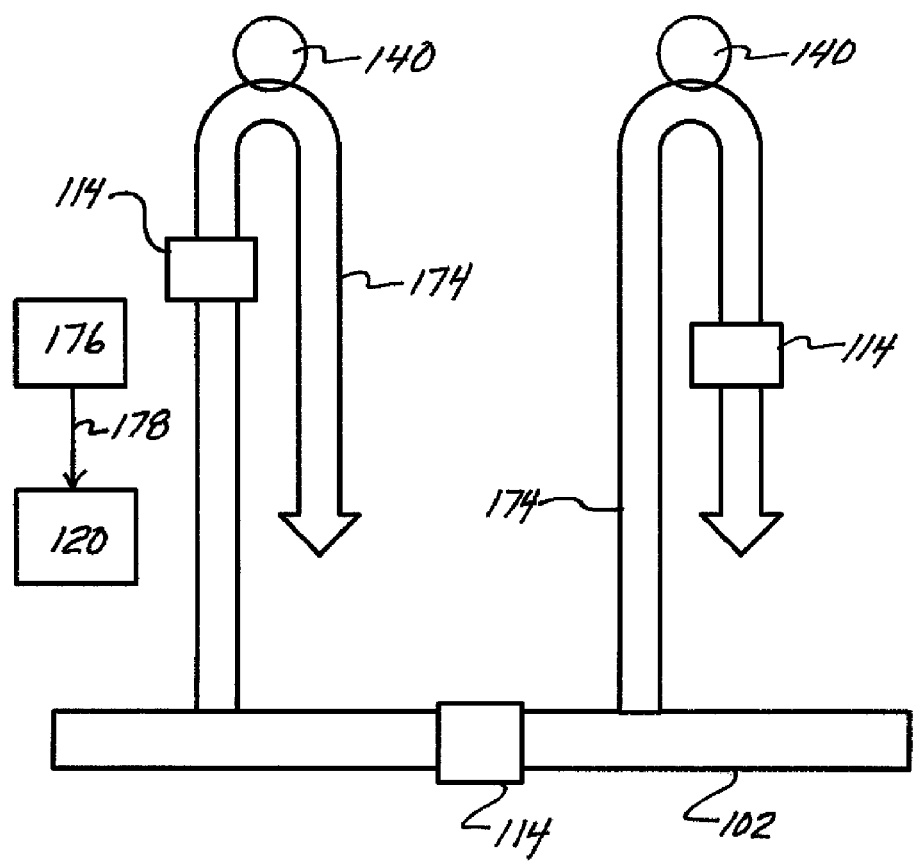
FIG. 11 is a schematic illustration of a packaging system of the subject invention showing a portion of a conveyor assembly having one or more paths diverting therefrom for directing pallets to one or more secondary locations, such as unloading stations, and for transporting unloaded pallets back to the conveyor assembly.
Figure 12:
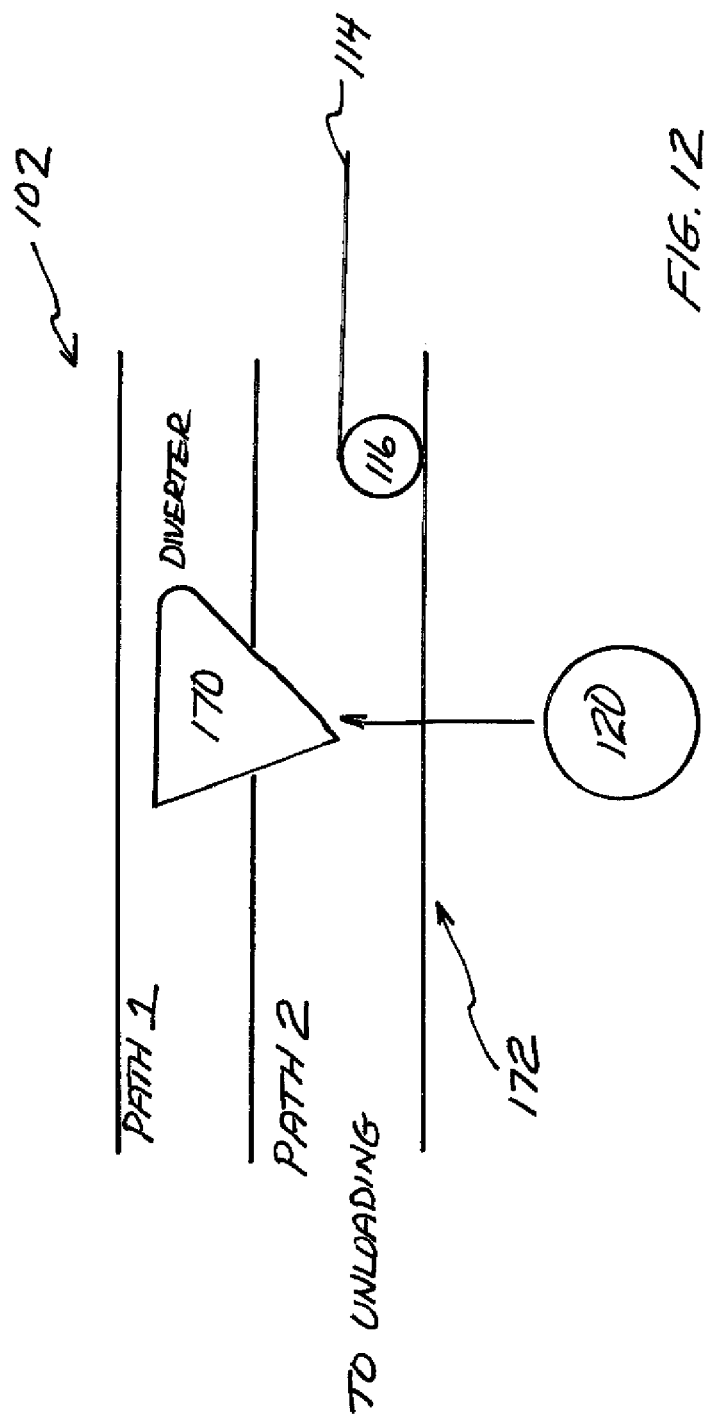
FIG. 12 is a schematic illustration of a portion the conveyor assembly of FIG. 12 showing a diverter that operates to change the path of a pallet as it travels along the conveyor assembly to allow the pallet to move to another conveyor assembly or to a second location for unloading the pallet.

Referring to FIGS. 11 and 12, another preferred embodiment of the packaging system of the subject invention is shown whereby pallets 114 traveling along a first conveyor assembly 102 operate to move one or more articles 134 to one or more second locations 140, such as one or more article unloading stations. As shown, in a preferred embodiment the first conveyor assembly 102 includes a switching apparatus 170, such as an electromagnetic switch, that can be operated by the control system 120 to move a portion 172 of the first conveyor assembly 102 (or redirect the such that upper and lower mounts 116) such that the pallets 114 traveling along the first conveyor assembly 102 are diverted to a secondary rail 174 that directs the pallets 114 to a second location, such as an article unloading station 140. Once the article(s) are unloaded from the pallet(s) 114, the unloaded pallets 114 are then directed to move along the secondary rail 174 until they merge with and continue traveling along the first conveyor assembly 102. In a preferred embodiment of the invention, the packaging system 100 includes an article sensor 176 that operates to sense if the articles 134 have been unloaded from the pallet 114 and transmits a signal 178 to the control system 120 when the pallet has been unloaded. Preferably, the pallets 114 remain at the unloading station 140 until the control system 120 receives the signal 178 that the pallets have been unloaded. In a preferred embodiment of the invention, the control system 120 can operate such that no additional pallets are directed to the particular unloading station 140 until the pallets at that unloading station have been unloaded thereby reducing or preventing pallets from delivering articles to the unloading system at a speed faster than the articles can be unloaded. Further, in another preferred embodiment of the invention, the control system can operate such that pallets are not directed to a particular second location or unloading station, such as in the event an operator or an unloading apparatus or device is not functioning at the unloading station.

Figure 13:
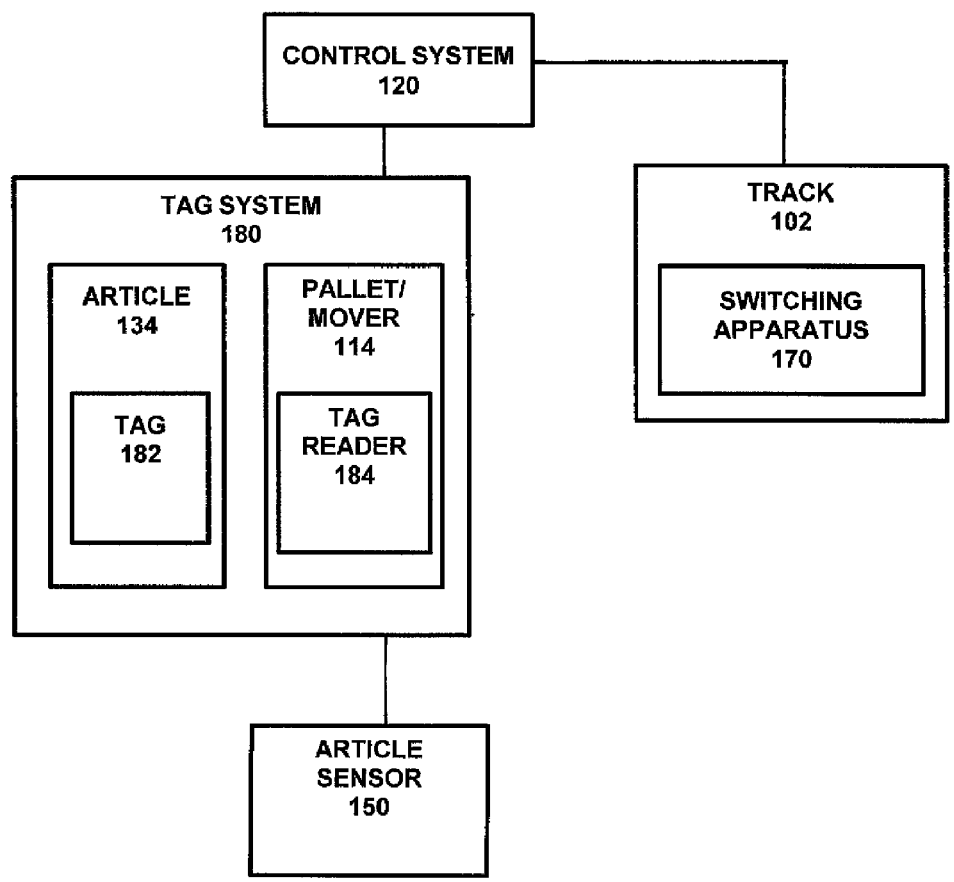
FIG. 13 is a schematic illustration of another preferred embodiment of the packaging apparatus having an article tag system that cooperates with the control system to ensure that the proper article is placed onto the proper pallet and for monitoring and maintaining an inventory and packaging information.

As illustrated in FIG. 13, another preferred embodiment of the packaging apparatus 100 includes an article tag system 180 that cooperates with the control system 120 to ensure that the proper article 134 is placed onto the proper pallet 114. In a preferred embodiment, the tag system 180 includes a tag 182 attached to each article 134 a plurality of tag readers 184 such that each pallet 114, 114b includes a tag reader 184 mounted thereon. In a preferred embodiment, the tag 182 is in the form of a bar code and the tag reader 184 is a bar code reader. In another preferred embodiment, the tag 182 is in the form of a radio frequency identification devices (RFID) comprising a RFID tag 182 and the tag reader 184 which is in the form of a RFID reader. Each tag 182 provides a unique code for the particular article 134. For example, each article 134 of a particular type can have the same unique code. In another preferred embodiment, each article 134 can have its own unique code. It should be understood that the unique code is transmitted to the control system 120 which is then used to monitor the movement of the article 134 as it travels from a storage location, along the track assembly, to a designated location. It should also be understood that using RFID tags and by connecting the tag reader in the form of a RFID reader to individual movers, allows for the tag to be in the form of a relatively inexpensive passive RFID tag. It should also be understood that the use of an RFID tag and reader eliminates the need for the tag to be placed in a specific location and facing in a direction to be read by the optical reader necessary for bar code scanning systems or other optical tag and scanner systems.

Figure 14:
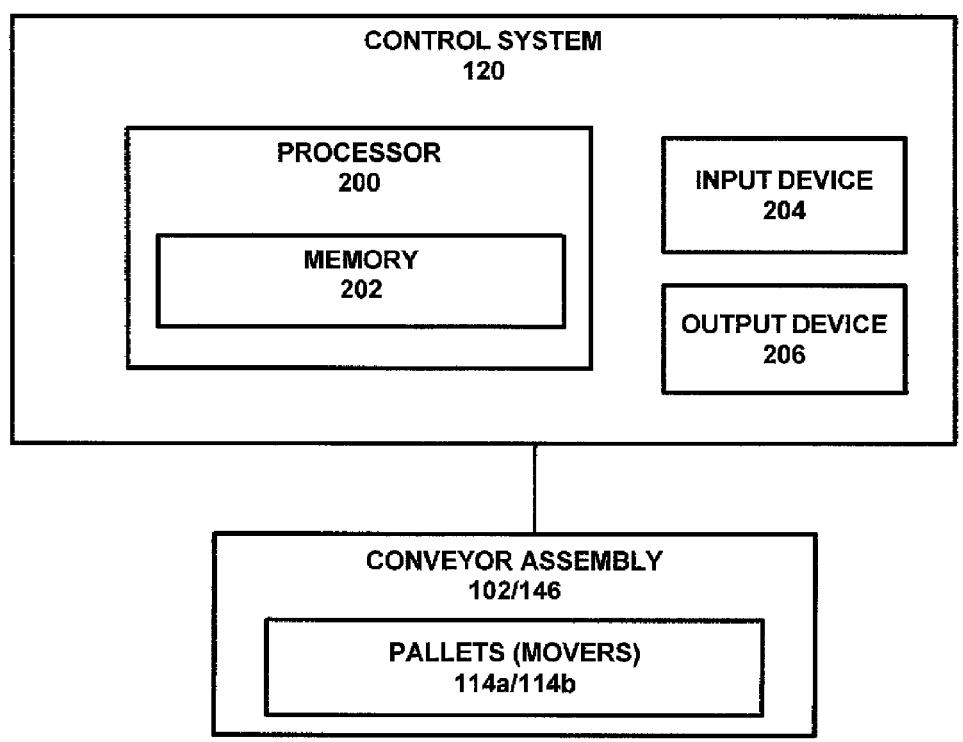
FIG. 14 is a schematic illustration of a preferred embodiment of the control system for controlling the operation of the packaging system of the subject invention.

Referring to FIG. 14, the control system 120 is shown comprising a processor 200, such as a computer and other devices, having a memory 202 and suitable input device 204, like a keypad, touch screen, or any other suitable input device that can accept information or instructions from an operator (including operating instructions directing movement or controlling the direction or path of a pallet); one or more suitable output devices 206, such as a computer display, printer, image-forming or display device, and the like. It should be understood that the memory 202 can include any conventional data storage device such as any of the usual devices used for the storage of data, such as computer hard drives, floppy discs, binary codes, optical bits, mechanical scribes, magnetic tapes, compact discs, digital audio tapes, analog tapes, vinyl discs, and any device or devices capable of storing data. It should also be understood that the control system 120 can include any combination of the above components, or any number of different components, peripherals, and other devices. Preferably, the control system 120 operates under the control of an operating system, such as the WINDOWS operating system developed by Microsoft Corporation or the MACINTOSH operating system developed by Apple Computer Corporation. It should be understood, however, that other operating systems could be utilized to implement the system software 208.

Referring to FIG. 15, a preferred embodiment of the invention is shown whereby an operator enters into the control system using the input device, information identifying the article, as well as information such as the number of articles, and the desired packaging configuration (number of rows, columns, and stacks, including the number of articles in each stack) (Step 300). The control system then operates to direct one or more pallets (movers) along a first conveyor assembly such that each pallet aligns with one or more article delivery systems such that one or more articles are loaded onto one or more pallets (Step 302). In a preferred embodiment, the two or more articles can be loaded onto an individual pallet to form a stack. The control system then operates to individually control each pallet as it travels along the first conveyor system to the pallet's designated second location (Step 304). At the designated second location, the control system operates such that each pallet is unloaded by a deposit mechanism (step 306) that functions to deposit the articles from a pallet directly onto a platform or into a container or package (Step 308), or deposits the articles onto a pallets traveling along a second conveyor assembly (Step 310). In a preferred embodiment of the invention, the control system further operates to adjust the speed of each pallet traveling along the first and/or second conveyor assemblies to adjust the number and/or proximate adjacent placement of the stacks of articles (Step 312). In another preferred embodiment of the invention, the deposit mechanism operates to create a desired number of rows and columns of articles (Step 314). In another preferred embodiment of the invention, the control system also operates to pivot the pallets such that the articles are unloaded and deposited onto a platform or into a container or onto the second conveyor assembly in a desired orientation (Step 316). The pallets traveling along the second conveyor assembly are directed to an unloading station where they are unloaded as described in Steps 306 and 308 above.

Figure 16:
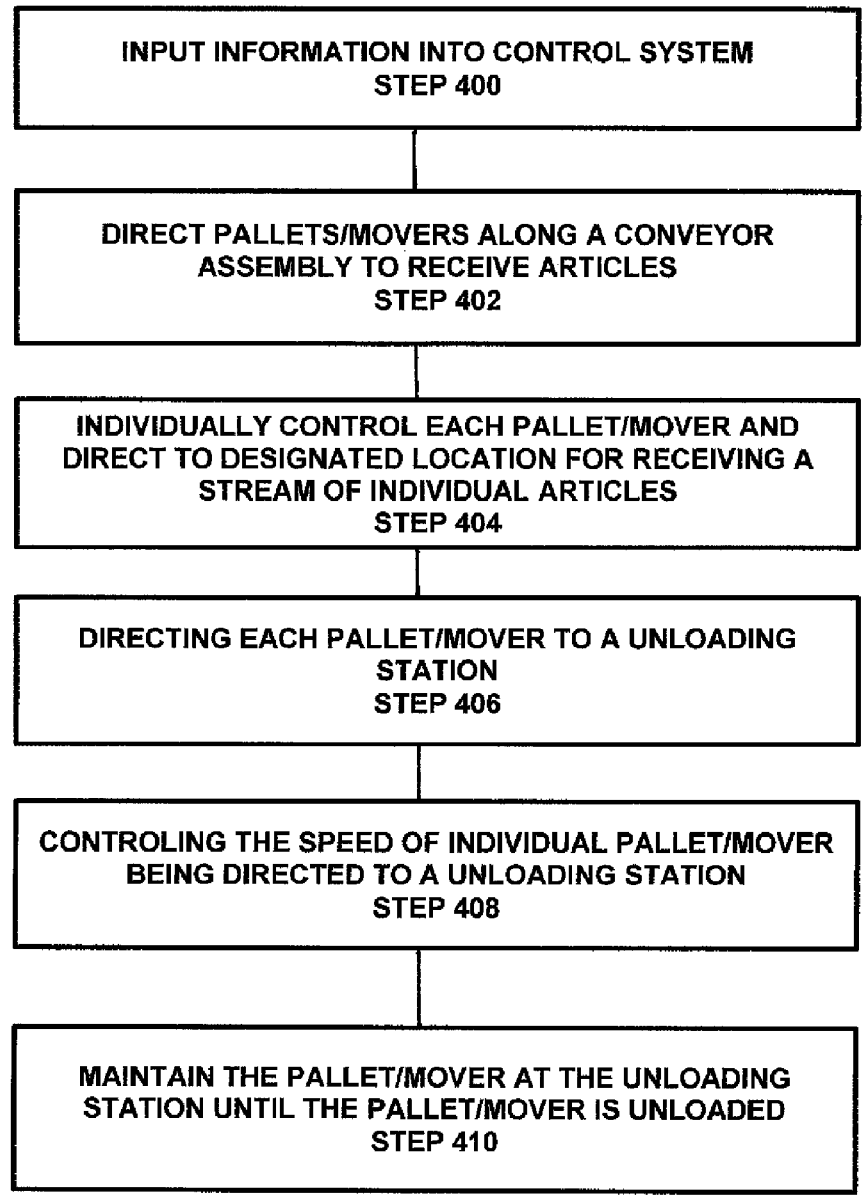
FIG. 16 is a flow diagram showing another preferred method of operation of the packaging system of the subject invention.

In another preferred embodiment, as shown in FIG. 16, the method of operation includes inputting information into the control system using the input device, information identifying the article, as well as information such as the number of articles, and the desired packaging configuration (number of rows, columns, and stacks, including the number of articles in each stack) (Step 400). Using a conveyor assembly, wherein the conveyor assembly is an intelligent conveyor system, and directing the individual pallets (movers) into position to receive a stream of individual articles (Step 402) and placing one or more articles on the individual pallets (Step 404). Each pallet is then directed to one or more unloading stations for unloading articles from the individual pallets (Step 406). The control system further operates such that the individual pallets remain at the at least one article unloading station until the articles are unloaded from the pallet (Step 408). It should be understood that the control system operates to control the speed of the pallets traveling along the conveyor assembly to as well as selecting the unloading station that will receive a pallet, such as diverting a pallet from one unloading station to another unloading station, to ensure that a back-up of pallets (articles being delivered) does not occur. Further, the control system will operate to maintain a pallet (mover) at a unloading station until the pallet has been unloaded (Step 410).

It should now be apparent to one skilled in the art that the packaging system of the subject invention operates to receive and transport articles from a first location, such as a storage location, and transport the articles to a second location such that the articles are unloaded and placed into a desired number of rows, columns, and/or stacks, can easily handle articles with irregular shapes, and can be easily converted to handle different size articles and/or to arrange the articles into various packaging configurations. Further, it should now be apparent that the packaging system of the subject invention can easily handle articles with irregular shapes, can be easily converted to handle different size articles and/or to arrange the articles into various packaging configurations. Further, the packaging system of the subject invention can easily pack different articles into a single container or package, can be easily modified to accommodate different product streams, and can automatically adjust the delivery of articles to one or more unloading stations.

While the methods and components described herein constitute preferred embodiments of the invention, it is to be understood that the invention is not limited to the precise method and components, and that changes may be made therein without departing from the scope of the invention which is defined in the appended claims.

The invention claimed is:

1. A packaging system for receiving articles at a first location and supports transporting the articles to a second location, the packaging system comprising:
   a first conveyor assembly having a plurality of individual supports movable along the first conveyor assembly independently of one another;
   an article receiving station configured to receive a stream of individual articles and to place one or more articles on the individual supports of the first conveyor assembly;
   a second conveyor assembly;
   an article unloading station configured to unload articles from the individual supports of the first conveyor assembly and placing the articles on the second conveyor assembly; and
   a control system configured to control motion of the individual supports traveling along the first conveyor assembly;
   wherein the control system is configured to control the article unloading station to unload the one or more articles from each individual support onto the secondary conveyor system to form a stack having a desired number of articles in each stack.

2. The packaging system of claim 1, wherein the first conveyor assembly is configured to control independent movement of each individual support along the first conveyor assembly.

3. The packaging system of claim 1, wherein the second conveyor assembly comprises a plurality of individual supports moved independently of each other along the second conveyor assembly.

4. The packaging system of claim 1, wherein the article unloading station comprises a deposit mechanism configured to deposit articles from the each individual support onto the second conveyor assembly; and wherein the control system is configured to control the movement of each individual support and the operation of the second conveyor assembly to form a predetermined number of adjacent stacks.

5. The packaging system of claim 1, further comprising a loading mechanism configured to place one or more articles onto an individual support and having an article sensor configured to provide a signal to an operator and/or to the control system if the article is not in proper alignment on the individual support.

6. The packaging system of claim 1, wherein the control system operates to regulate speeds of the individual supports traveling along the first conveyor assembly to the article unloading station to form a desired number of adjacent stacks.

7. The packaging system of claim 1, wherein the control system is configured to regulate speeds of the individual supports traveling along the first conveyor assembly and the speed of the second conveyor assembly to place the articles into a desired number of rows, columns and/or stacks.

8. The packaging system of claim 1, comprising a gripping mechanism configured to grasp one or more articles and to place the one or more articles onto the individual supports.

9. The packaging system of claim 1, wherein the individual supports of the first conveyor assembly are pivotally coupled to mounts to rotate articles being transported by the supports into desired orientations.

10. The packaging system of claim 1, wherein the first conveyor assembly includes a switching apparatus configured to divert one or more individual supports transporting an article along the first conveyor assembly to a desired article unloading station and wherein the individual supports remain at the desired article unloading station until the article is unloaded from the supports.

11. A packaging system for receiving articles at a first location and transporting the articles to a second location, the packaging system comprising:
   a first conveyor assembly having a plurality of individual supports movable along the first conveyor assembly independently of one another;
   an article receiving station configured to receive a stream of individual articles and to place one or more articles on the individual supports of the first conveyor assembly;
   at least one article unloading station configured to unload articles from the individual supports; and
   a control system configured to control motion of the individual supports traveling along the first conveyor assembly;
   wherein the control system is configured to control the unloading station to unload one or more articles from each individual support at the second location to form at least one stack having a desired number of articles.

12. The packaging system of claim 11, wherein the control system is configured to control the article unloading station to unload the one or more articles from each individual support at the second location to form more than one stack having a desired number of articles and wherein each stack is in a desired proximity to other stacks.

13. The packaging system of claim 11, wherein the control system is configured to regulate speeds of the individual supports traveling along the first conveyor assembly to place the articles into a desired number of rows, columns and/or stacks.

14. The packaging system of claim 11, wherein the first conveyor assembly includes a gripping mechanism configured to grasp one or more articles and place the one or more articles onto one of the individual supports.

15. The packaging system of claim 11, wherein the individual supports of the first conveyor assembly are pivotally coupled to mounts to rotate the articles being transported by the supports into a desired orientation.

16. The packaging system of claim 11, wherein the first conveyor assembly includes a switching apparatus configured to divert one or more individual supports transporting the articles along the first conveyor assembly to the at least one article unloading station and wherein the individual supports remain at the at least one article unloading station until the articles are unloaded from the supports.

17. A method for receiving articles at a first location and transporting the articles to a second location, the method comprising the steps of:
   conveying the articles via a first conveyor assembly having a plurality of individual supports movable along the first conveyor assembly independently of one another;
   receiving a stream of individual articles and placing one or more articles on the individual supports of the first conveyor assembly;
   unloading articles from the individual supports; and
   controlling motion of the individual supports traveling along the first conveyor assembly via a control system to unload one or more articles from each individual support at the second location to form at least one stack having a desired number of articles.

18. The method of claim 17, wherein the control system is configured to control unloading of a selected number the one or more articles from each individual support at the second location to form stacks arranged in a desired number of rows and columns and wherein each stack is in a desired proximity to other stacks.

19. The method of claim 17, wherein the control system is configured to regulate speeds of the individual supports traveling along the first conveyor assembly to place the articles into the desired number of rows, columns and/or stacks.

20. The method of claim 17, further comprising the step of diverting one or more individual supports transporting the articles along the first conveyor assembly to at least one article unloading station and wherein the control system is configured to command individual supports to remain at the at least one article unloading station until the articles are unloaded from the supports.

* * * * *